(12) United States Patent
Reese

(10) Patent No.: US 8,390,581 B2
(45) Date of Patent: Mar. 5, 2013

(54) SOFTWARE BASED TOUCHSCREEN

(75) Inventor: Charles Reese, Grapevine, TX (US)

(73) Assignee: Production Resource Group, LLC, New Windsor, NY (US)

( * ) Notice: Subject to any disclaimer, the term of this patent is extended or adjusted under 35 U.S.C. 154(b) by 918 days.

(21) Appl. No.: 12/494,578

(22) Filed: Jun. 30, 2009

(65) Prior Publication Data

US 2009/0322707 A1 Dec. 31, 2009

Related U.S. Application Data

(60) Provisional application No. 61/076,857, filed on Jun. 30, 2008.

(51) Int. Cl.
*G06F 3/041* (2006.01)

(52) U.S. Cl. ............. 345/173; 700/22; 315/291

(58) Field of Classification Search .......... 345/173; 315/294–307; 700/19–22
See application file for complete search history.

(56) References Cited

U.S. PATENT DOCUMENTS

| | | | | |
|---|---|---|---|---|
| 5,430,356 | A * | 7/1995 | Ference et al. | 315/291 |
| 6,608,617 | B2 * | 8/2003 | Hoffknecht et al. | 345/173 |
| 2002/0001393 | A1 * | 1/2002 | Jones et al. | 382/100 |
| 2002/0067144 | A1 * | 6/2002 | Hoffknecht et al. | 315/291 |
| 2005/0125083 | A1 * | 6/2005 | Kiko | 700/19 |
| 2006/0161270 | A1 * | 7/2006 | Luskin et al. | 700/22 |
| 2008/0079604 | A1 * | 4/2008 | Madonna et al. | 340/825.72 |
| 2009/0256811 | A1 * | 10/2009 | Pasquariello | 345/173 |

* cited by examiner

*Primary Examiner* — Amare Mengistu
*Assistant Examiner* — Vinh Lam
(74) *Attorney, Agent, or Firm* — Law Offices of Scott C. Harris, Inc.

(57) ABSTRACT

A software touchscreen displayed on start up for a LAN for an automated light. The software touchscreen is displayed by the software on initial startup, and later, after the initial startup, the same touchscreen is used for controlling the light.

4 Claims, 4 Drawing Sheets

SOFTWARE BASED TOUCHSCREEN

This application claims priority from provisional application No. 61/076,857, filed Jun. 30, 2008, the entire contents of the disclosure of which is herewith incorporated by reference.

BACKGROUND

Commercial stage lighting is used in commercial environments and typically remotely controllable, and produces a light output greater than 1000 lumen. This kind of lighting is often set up and taken down as part of a show.

It may be advantageous to include controls that facilitate setting up the device. These devices are often connected to a network via a network connection. The network connection can be for example ethernet, DMX, ArtNet, or multiples.

When these lights are placed in a network, each light has an address that identifies it on the network.

SUMMARY

Embodiments a simplified system of entering an address that identifies a light on the network, using existing hardware. A special set of screens for a touchpad is defined

DETAILED DESCRIPTION

In an embodiment, a lighting fixture 100 may include a moving head 105 that is connected to a base 110. The base 110 has a bottom surface 115 on which the base can rest, when the light is in its inverted position with the light facing up. The light may alternatively be hung from a truss, using a clamp that is attached to the surface 115.

These lights may be stored in their stowed position, as shown, where the light part is essentially exactly parallel with the base part, and held into place in that exactly parallel position. For example, this may use the techniques described in our co-pending application 61/076,756, the entire contents of the disclosure of which is here with incorporated by reference. In this position, the light may be easier to transport, since it is stowed.

Figure 1B:
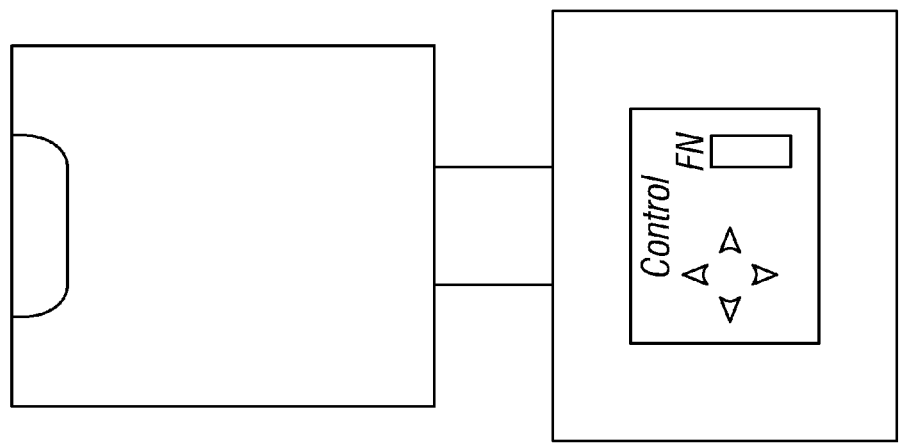
FIG. 1B shows the light and the touch screen, as operable in other modes.
Figure 1A:
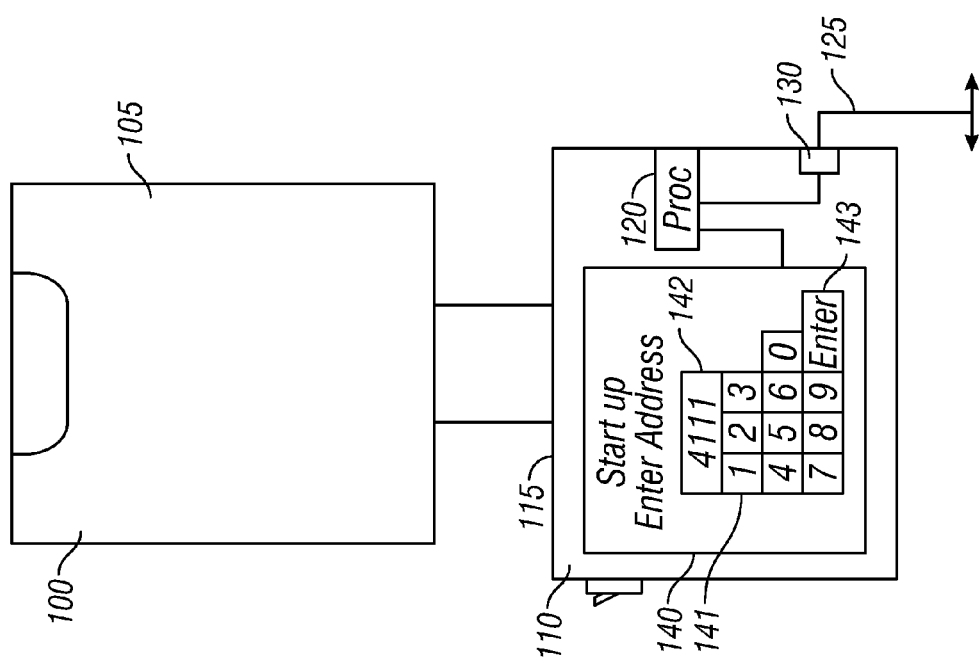
FIG. 1A shows a light with a software touchscreen, configured to operate only on initial startup.

In operation, when the light is first turned on, the light initially comes up in the state shown in FIG. 1A. A light is software controlled by internal processor 120, and can also receive commands over the network 125 into its network port 130. Those commands may be interpreted by the processor 120, and cause the light to take some action. In addition, however, there is a local control 140, which is a touchscreen which can be reconfigured by the processor 120, and on which certain commands can be entered and executed by the processor 120.

Figure 2:
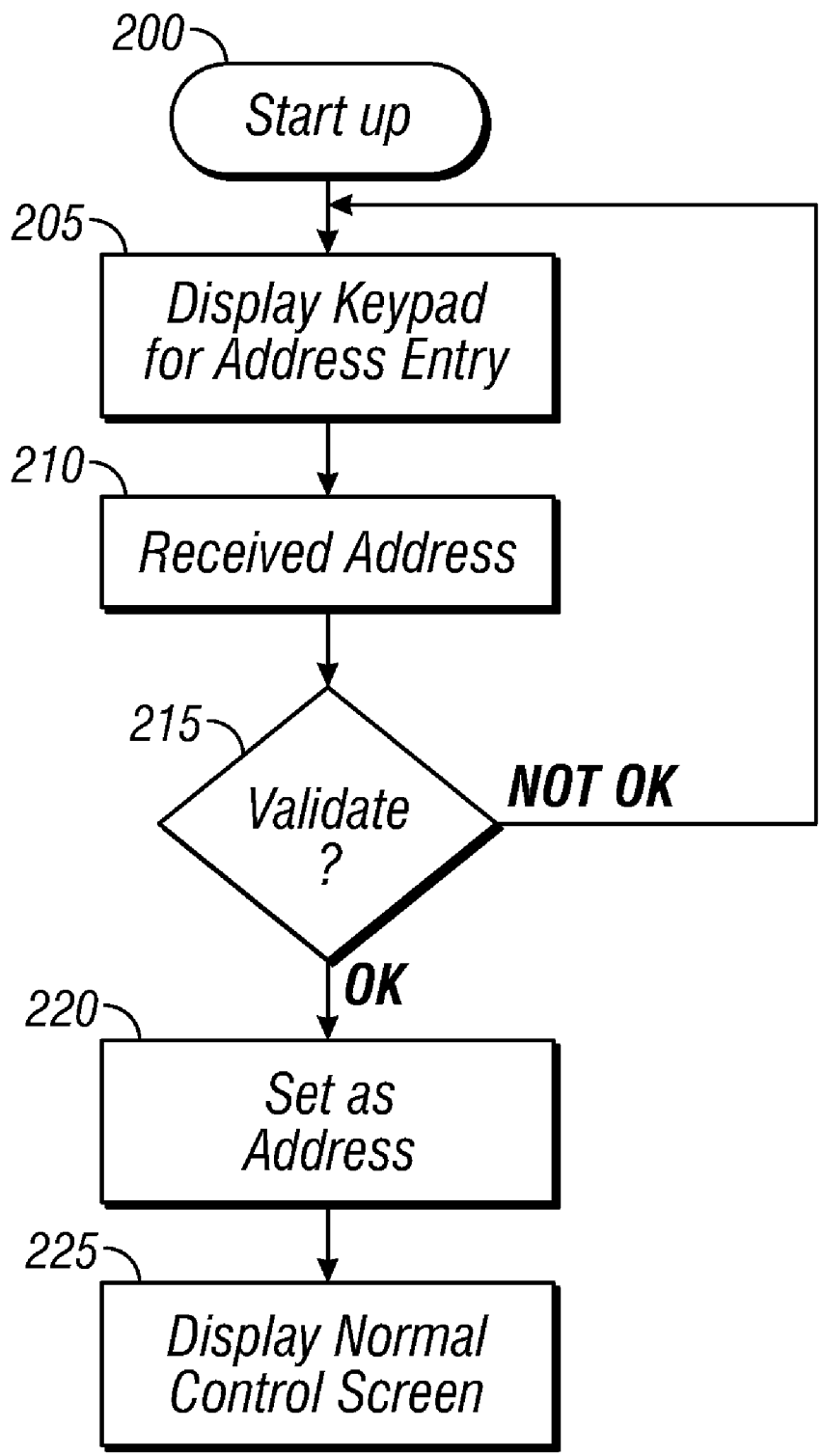
FIG. 2 shows a flowchart of software operations that control the lighting device.
Figure 3:
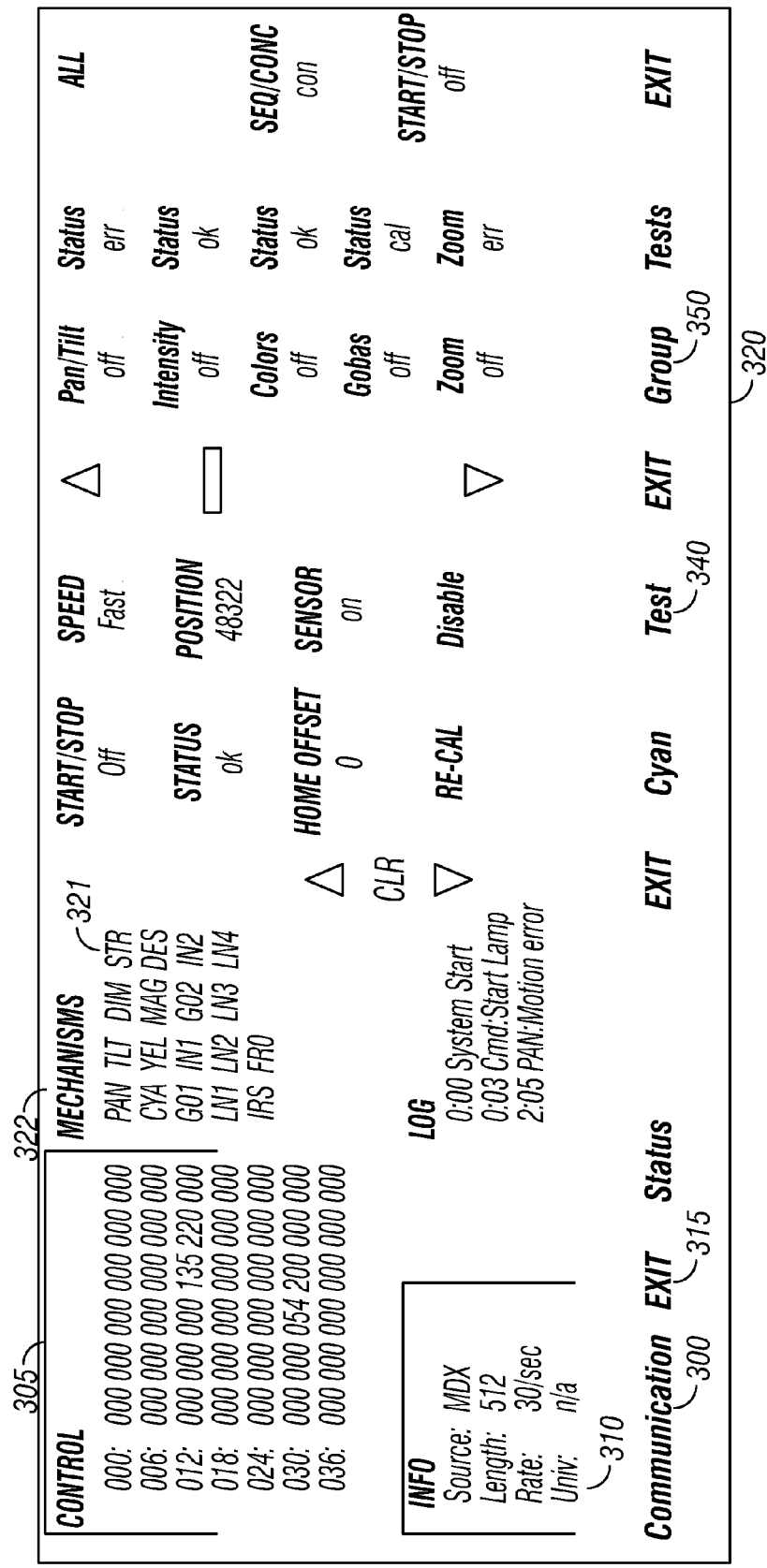
FIG. 3 illustrates a set of tests for the touchscreen which can be carried out.

The processor runs the routine shown in the flowchart of FIG. 2. When startup is detected at 205, the processor reconfigures the touchscreen to display a keypad for address entry at 205. This keypad is shown as 141 in FIG. 1A. This screen may also display, for example, a message saying "start up mode—enter address". The touchscreen includes the ability for a number of numbers to be entered. Each number that is entered may be echoed back on a numerical display 142. For example, when the number four has been entered as the first digit, that number four is displayed as the first digit in 142. This allows the user to see the address they have entered.

The user enters an address at 142, then presses the enter key at 143 to enter that address as being the desired fixture address. The address is received by the processor at 210, and to the extent possible validated at 215. This may be, for example, a validation of whether this is an acceptable format address, in the right numerical range, and the like. If the light is already on the network, this may also check to see if there are any network conflicts with the entered address.

If the validation is not okay, the address screen is redisplayed, requiring the user to enter a new address. However, if validation is okay at 215, the address is set at 220 as the fixture address, and the fixture will operate using that address thereafter.

Once this address has been properly set, the fixture reverts to its normal mode, in which the touchscreen 140 displays a normal control screen at 225. This normal control screen is shown is 210 in FIG. 1B. The user can control conventional functions, such as lighting functions, e.g, lamp on/off; move the moving head; and other operation of the light to change its light producing characteristics.

This may facilitate the setup of lights, since it automatically provides the initial touchscreen capability at start up, thereby facilitating entering the original address in this way.

In normal operation when the light is being controlled, the touchscreen can have a number of different functions which can be used by the operator for carrying out various functions. The user can execute a "next" button to go between the screens or can select a screen from a main screen.

A screen 300 defines a communication test screen that displays a sequence of incoming bytes to the luminaire. The top part of the screen 305 displays a sequence of incoming control bytes. Color coding shows which of the values are changing. For example, in the screen 305, in section 012, one can see that the bytes 135 and 220 are both changing. This also includes an info section on the bottom as 310. The info section represents the source, here DMX, the packet length here 312, rate and other information. For DMX, there may be a number of different universes, so the specific universe can be selected. The user can also select to exit the selected screen 300 by selecting the exit button 315.

The status screen at 320 uses color coding to indicate the real-time status of each mechanism including the operational error conditions. For example, different mechanisms can be displayed in color to indicate an error. The mechanisms including pan, tilt, the colors, gobos, and other can be selected in this way. For example, mechanisms such as tilt 320 can be I mean 321 can be displayed in green to show that the tilt mechanism is working properly. Mechanisms such as the pan, however, 322 may be displayed in red or yellow to show that there is an error.

The log shown as the bottom part of this display shows the different actions and any errors which have occurred. For example, this allows monitoring different statuses of the lamp.

Screen 340 shows the "Cyan test" which controls exercising the individual mechanisms using pre-test preset sequences and speed. The tests can be executed by turning "on" the test, in which case the status button shows the test as "on", otherwise showing the test as "off". The status is shown as "ok", at different speeds, which can be "fast" or "slow". The status of the test is also displayed here as "ok", but can also be "error".

This also allows recalibration, or disabling the function if the test fails.

Another control allows manual control of the mechanism using a graphical slider.

This screen also shows the current state of the mechanism including the motor position and a sensor input state.

While this is shown for one of the color wheels (here cyan) it should be understood that this can be shown for any of a plurality of different color wheels, or for any other mechanism.

Group tests at 350 can be carried out to select combinations of set functions to test. This also shows the operational status of each of the sets of functions. For example, pan and tilt, intensity, colors, gobos and zoom can be tested. The setting "off" means the test is not running. The status of the previous test is also shown, "ok", "error" or "cal", meaning that it needs calibration.

This allows one fixture to trigger other fixtures via the communication lines and also to show whether the fixture is being externally controlled.

Figure 4:
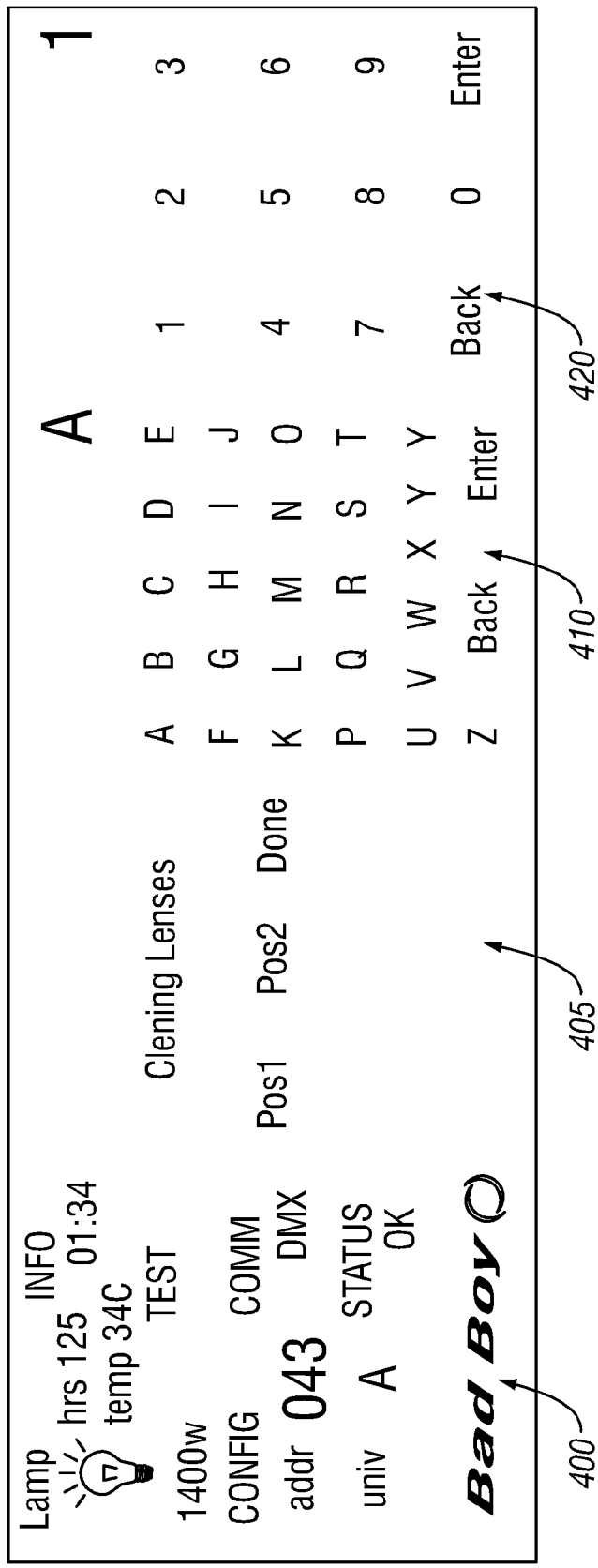
FIG. 4 illustrates a series of functions which can be carried out on the touchscreen.

The main screen, shown as 400 in FIG. 4 shows the overall fixture status, and provides interface to the other functions. For example, the shows the configured address, DMX universe, the lamp, lamp hours and temperature, as well as time up are all shown. It also allows selecting the other functions, shows the test, communication and status.

The cleaning lenses screen at 405 allows controlling the fixture head to a specified position that provides access to cleaning each surface of each moving lens. Here, there are only two positions, where these positions may be set according to characteristics of the luminaire.

The alpha keypad at 400 provides access to alphanumeric functions, and a numeric keypad at 420 provides access to numeric functions. This can be done for information such as addressing or labels via a soft keypad.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other commands and command forms can be used. Other screens can be shown on the touchscreen. Other forms of lighting devices can be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35

USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the subject matter of the claims and the embodiments and the claims. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system, comprising:
   a lighting fixture including a lighting head, and a base part associated with said lighting head, said base part having a reconfigurable screen that allows displaying information and accepting inputs of information on said screen, said reconfigurable screen being controlled by a processor that is associated with controlling other functions within said lighting fixture, and wherein said processor controls said screen to initially and automatically show a screen on startup with a soft keypad that allows entering an initial address of the lighting fixture, detects entry of said initial address, and sets said light to have that entered initial address, and responsive to setting said initial address, reconfigures said reconfigurable screen to display a control screen for said lighting fixture which is different than said screen shown on start up.

2. A system as in claim 1, wherein said the reconfigurable screen is a touchscreen that is controlled by the processor.

3. A method as in claim 1, wherein said other functions control screen for said light which is different than said screen shown at startup controls lighting functions.

4. A system as in claim 3, wherein said processor verifies said address prior to accepting said address.

\* \* \* \* \*